Nov. 25, 1952 J. C. MANLEY 2,619,282

ELECTRONIC SIGNAL RESPONSIVE PREDETERMINING CIRCUIT

Filed Dec. 22, 1950

INVENTOR.
JOHN C. MANLEY

BY [signature]

ATTORNEY.

Patented Nov. 25, 1952 2,619,282

UNITED STATES PATENT OFFICE 2,619,282

ELECTRONIC SIGNAL RESPONSIVE PREDETERMINING CIRCUIT

John C. Manley, Barrington, R. I., assignor, by mesne assignments, to Reconstruction Finance Corporation, Boston, Mass., a corporation of the United States Application December 22, 1950, Serial No. 202,337

7 Claims. (Cl. 235—132)

Figure 1:
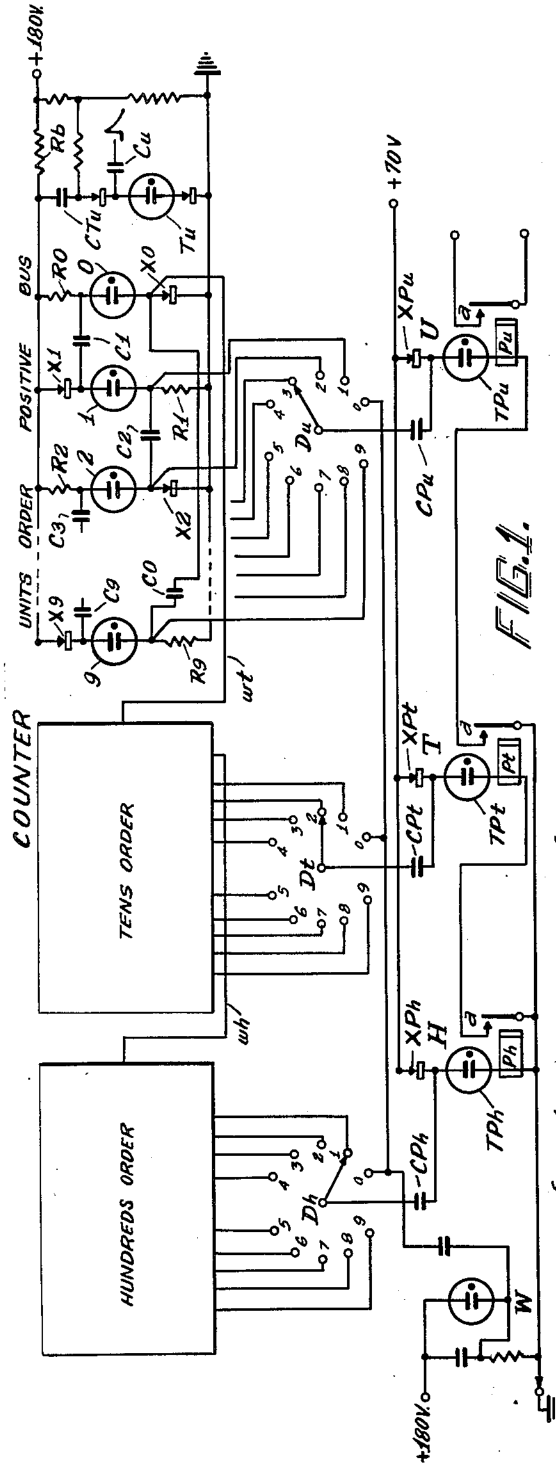

This invention relates to predetermining circuits especially useful in conjunction with a plural order counter to detect the accumulation of any predetermined number of counts by the counter, but the predetermining circuits may have other allied uses.

A predetermining circuit for use with a plural order counter has a succession of circuit stages respectively associated with successively lower counter orders. Selector means may be interposed between each predetermining stage and the related counter order and adjusted to transmit any desired digit representing impulse from the counter order to the predetermining stage. Assuming the counter to be a decimal notation counter for adding count pulses, the units order will be stepped directly under control of the count pulses, while the higher orders will be stepped only by carries from lower orders when the latter advance from 9 to 0. Obviously, a lower order will develop a predetermined digit one or more times before a higher order advances to a predetermined digit position. Therefore, in order for the predetermining circuit to sense a predetermined plural order number correctly, it is required that operation of a predetermining stage under control of a lower order of the counter be withheld until the preceding predetermining stage has detected the desired digit in the related higher order of the counter. For example, if the predetermining circuit is to sense the advance of the counter to the number 123, the predetermining stage related to the hundreds order of the counter should operate first to sense hundreds place digit 1 when 100 counts have been accumulated, the next predetermining stage should operate next after 20 more counts have been tallied, and the last predetermining stage should operate thereafter when three more counts have been added. When all the predetermining stages have operated, the predetermining circuit may produce an output signal or activate a work circuit as a manifestation that the counter has accumulated the predetermined number.

The present invention has as an object the provision of an improved predetermining circuit of extremely simple construction and employing simple gaseous discharge diodes in successive stages.

The invention also has as an object the provision of a predetermining circuit the successive stages of which are sequentially primed or conditioned, for operation by related counter orders, by means of a novel coupling arrangement between the stages, particularly a sequential coupling arrangement in which each succeeding stage is connected across voltage lines only after and in consequence of operation of the preceding stage.

More specifically, the invention contemplates a predetermining circuit, the stages of which comprise gaseous discharge diode circuits sequentially connectible to voltage lines to be conditioned for response to input digit signals from the related counter orders. According to a specific aspect of the invention, relays will be used to couple the predetermining stages sequentially to voltage lines.

According to one embodiment of the invention, each predetermining stage will include only one gaseous diode of the type for furnishing enough output power to operate a sensitive relay. Such diode has a low voltage spread and the components of the predetermining circuit must be adjusted closely to avoid premature operation of the diodes by extraneous, weak impulses from the counter. This difficulty is avoided in a second embodiment by using two diodes in each predetermining stage, the first diode being of the type having a high voltage spread and connected to a counter order to receive a predetermined digit signal. The second diode in the predetermining stage will be of the type having a low voltage spread and capable of operating a sensitive relay. The second diode will be isolated from the counter circuit and not be subject to extraneous impulses from the counter but will operate only under control of the first diode in the same stage.

An object of the invention applicable to both embodiments and to predetermining circuits in general is the provision of special means to insure correct operation of the predetermining circuit when the predetermined number to be sensed contains 0 after any significant digit. Since, by the nature of a counter, the significant digit will be developed in a counter order only as a result of carry from the lower order when the latter goes from 9 to 0, the higher order will produce the significant digit representing signal only after the lower order has produced the 0 digit signal. Thus, the predetermining stage related to the higher counter order may operate and condition the predetermining stage for the lower counter order after the 0 digit signal from the latter has subsided. The predetermining stage related to the lower order will not again receive a 0 digit signal from the lower order until additional counts above the predetermined number have been added. This would lead to incorrect operation of the predetermining circuit. To avoid incorrect operation of the predetermining circuit when the predetermined number contains 0 after a significant digit, the invention provides artificial 0 digit signals for the predetermining stages. Specifically, an oscillator is provided to apply 0 digit signals to any predetermining stage which has been set to sense the digit 0.

Figure 2:
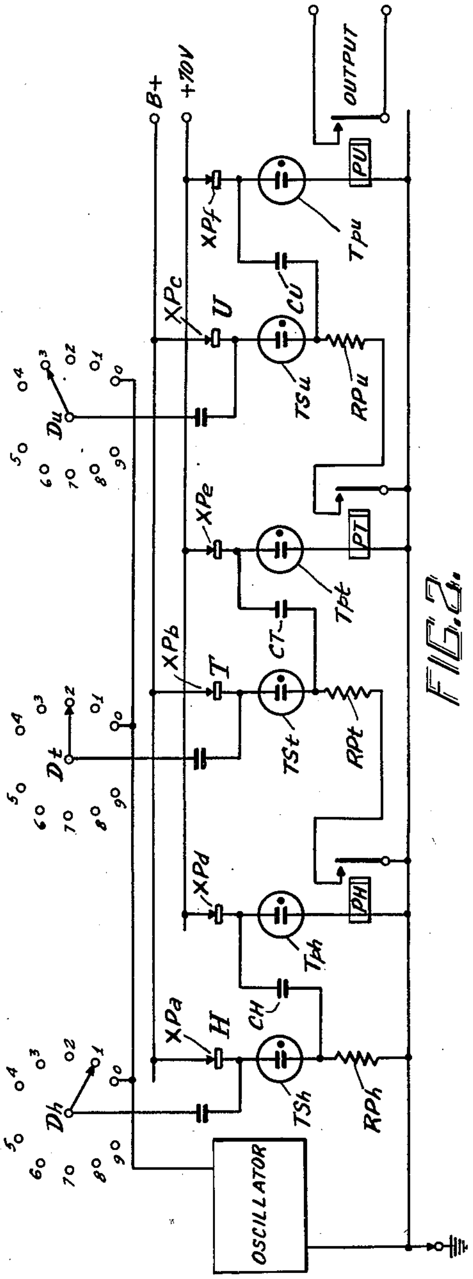

Other objects of the invention will be made clear in the accompanying detailed description and claims and be apparent from the drawings, in which:

Fig. 1 shows the wiring of the first embodiment of the predetermining circuit in conjunction with a diagrammatic and circuit showing of a representative three-order counter which may be used; and Fig. 2 shows the wiring of the other embodiment.

The predetermining circuit may be used to produce an output signal or activate a work circuit in response to input signals from different sources and representing ordered items of information developed in these sources. However, the predetermining circuit is especially adapted to sense any preselected number within the range of a plural order counter from which digit manifesting impulses may be extracted. As an example, the predetermining circuit may be used in conjunction with the type of counter disclosed in an article "Neon Diode Ring Counter" in the January, 1950 issue of "Electronics." In order that a clear understanding may be had of the manner of operation of the predetermining circuit, a brief description will be given first of the illustrated counter.

Fig. 1 shows elements of the units counter order. The other orders are similar and are shown in block diagram form. Each counter order has a ring of ten digit manifesting stages and an associated triggering circuit by means of which entries of one are made into the counter order. Each digit manifesting stage consists of a glow discharge diode serially connected with a rectifier on one side and a resistor on the opposite side. Alternate stages have the resistors on different sides of the diodes and the rectifiers on different opposite sides of the diodes. The digit manifesting glow discharge diodes are designated 0 to 9 and the related rectifiers and resistors are respectively designated X0 to 9 and R0 to 9. Capacitance coupling is provided between the stages, capacitor C1 coupling stage 0 to stage 1, C2 coupling stage 1 to stage 2, and so on, with capacitor C0 coupling the last stage 9 to the first stage 0. The triggering circuit for the units order includes a glow discharge diode T*u* to which entry impulses are applied via a capacitor C*u*. Only one digit manifesting diode at a time is in a conducting state. Assume that diode 0 is conducting. Current flows from the positive terminal of a source of voltage supply, through a resistor R*b*, the resistor R0, the diode 0, and the rectifier X0 in the forward direction, to the ground bus. The values of R*b*, R0 and supply voltage are so chosen that the potential of the positive bus is maintained less than the striking voltage of the glow tubes so that there is no tendency for any other tube to strike. Capacitor C1 is charged to the potential across R0 by a circuit from the positive bus through X1 in the forward direction, the diode 0, and X0 in the forward direction, to the ground bus.

The diode T*u* in the triggering circuit is primed close to its striking potential by resistive connection of the anode to the voltage supply. Upon application a positive entry impulse by capacitor C*u* to the anode of T*u*, it fires and produces a steep drop in potential of the positive bus. The bus voltage is made to drop below the operating voltage of the diode 0, with the result that the diode 0 is extinguished. Then, as capacitor CT*u* in series with the triggering diode T*u* charges, the potential of the positive bus recovers exponentially towards its upper value. When diode 0 is extinguished, the capacitor C1 discharges slowly through the inverse resistance of rectifier X1 and thus produces a rise in potential at the anode terminal of diode 1. This rise added to the recovering voltage of the positive bus causes the voltage across diode 1 to be significantly greater than across any of the other digit manifesting diodes and is sufficient to cause diode 1 to strike. As diode 1 strikes, it depresses the positive bus voltage momentarily, causing triggering diode T*u* to be extinguished. The units order has now been advanced from 0 to 1. With diode 1 conducting, capacitor C2 is charged via X1 and X2 in the forward direction to the voltage appearing across resistor R1. The next count impulse applied to trigger tube T*u* causes it to fire again, depressing the bus potential to extinguish diode 1. Upon diode 1 being extinguished capactitor C2 discharges through the inverse resistance of X2 causing the lower electrode of diode 2 to become significantly negative. As the bus voltage recovers, the potential across diode 2 is greater than across any of the other digit manifesting diodes and is effective to fire diode 2. The count has thus been advanced by one and the units order now manifests digit 2. Similarly, successive entry impulses causes the diodes 3 to 9 to be successively conducting. The relation between the circuit of the diode 9 and the circuit of diode 0 is the same as between the circuits of diodes 1 and 2; hence, the 10th entry impulse will cause diode 9 to be extinguished and diode 0 then to be ignited. As diode 0 strikes, a positive impulse of potential appears at its cathode terminal. This positive impulse is utilized as a carry impulse and is transmitted by the lead *wt* to the tens order where it acts on a triggering circuit such as the one for the units order. The tens order triggering circuit acts in response to the carry impulse to advance the tens counter order by one. Similarly, when the tens order advances from 9 to 0, it produces a carry impulse on wire *wh* which triggers an entry circuit for the hundreds order, causing it to advance one count step.

It is to be noted that a positive impulse of potential appears at the cathode terminal of each manifesting diode when the diode fires. Preparatory to the diodes 0, 2, 4, 6 and 8 firing their cathode potential is primed to a negative potential with respect to ground and upon firing of one of these diodes, their cathode potential rises abruptly to ground potential. This rise in cathode potential of the diodes 0, 2, 4, 6 and 8 may be utilized as a positive impulse signal to the predetermining circuit. With regard to diodes 1, 3, 5, 7 and 9, upon the firing of one of these diodes there results a rise of the potential at its cathode terminal substantially to the potential across the cathode resistor. This use also is utilized as a positive digit signal to the predetermining circuit. In order that the positive digit signals may be selectively applied to the predetermining circuit, leads *w*1 to *w*9 are connected between the cathodes of diodes 1 to 9 of each order and a dial switch, D*u* for the units order, Dt for the tens order, and Dh for the hundreds order. The arms of the dial switches are connected to input circuits for the stages of the predetermining circuit.

The first embodiment of the predetermining system (see Fig. 1) has three stages H, T and U assigned to the hundreds, tens and units counter orders. Each of these stages includes a single 0.25 watt neon glow tube which may be of type NE48. The tubes in the stages H, T, and U are designated Tph, t and u, respectively. In series with tubes Tph, t and u, respectively, are the windings of sensitive relays Ph, t and u, respectively. The arms of switches Dh, t and u are connected by coupling capacitors Cph, t and u to the anodes of Tph, t and u. The coupling capacitors are sufficiently small that negative impulses received from the counter are differentiated and hence the positive digit impulses are always effective to trigger the predetermining tubes after the tubes have been conditioned.

The anodes of the predetermining tubes are connected via rectifiers Xph, t and u to a source of voltage which is a few volts below the striking voltage, but only the relay in series with tube Tph is permanently connected to ground. The relays in series with Tpt and Tpu are normally disconnected from ground. Operation of relay Ph will close its armature contacts a to connect relay Pt to ground; operation of relay Pt will similarly close its contacts a to connect relay Pu to ground.

As an example of the operation of the predetermining circuit, assume it is to sense the accumulation of number 123 in the counter. Switches Dh, t and u are set to positions 1, 2 and 3, respectively. At the instant the counter advances to 100, a positive impulse from the 1 tube of the hundreds order will be applied by switch Dh and coupling capacitor CPh to the tube TPh, increasing the potential across the tube to striking value. Tube TPh strikes and current flows through the winding of relay Ph, energizing the relay to close its contacts a. The closure of contacts a of Ph connects the diode and relay circuit of stage T to ground and the diode is now primed a few volts below its striking voltage. When 20 more pulses have been counted, the tens order tube 2 produces a positive impulse which is applied by switch Dt and capacitor CPt to diode TPt. Since TPt is primed, it strikes and relay Pt operates. Contacts a of Pt now connect relay Pu to ground and diode TPu is primed. Three more entry pulses to the counter advance the units order to 3 whereupon a triggering impulse for TPu is derived from the 3 tube of the units counter order. TPu fires and relay Pu operates, closing its contacts a to generate the required predetermined output signal.

Special provision is made to obtain a predetermined output signal when the predetermined number contains 0 after any significant digit. It may appear at first glance that if the predetermining circuit is to respond to number 230, for example, the input signal to the predetermining stage U may be derived from the 0 tube in the units order, the same as from any other digit manifesting tube. However, when the counter receives the 230th count impulse, the units order first switches from 9 to 0 and following this the tens order switches from 2 to 3. The tens order thereupon applies the 3 digit signal to tube TPt, the tube strikes, and relay Pt operates to prime stage U. Thus, stage U is not primed until after the units counter order has already returned to 0 and the positive 0 signal from the units order has already subsided. Unless special provision were made, the counter would then have to accumulate ten more pulses before the stage U is operated. The predetermined output signal would then be given after 240 counts instead of after the required 230 counts. This same difficulty arises with any number containing the digit 0. To insure correct operation of the predetermining circuit, the 0 signals are supplied to the predetermining circuit by an oscillator, such as the relaxation oscillator W. The output line of this oscillator is connected to the 0 spots of all the switches Dh, t and u. If any of these switches is set at 0 positon, it will transmit the artificial 0 digit signal from the oscillator to the predetermining stage associated with the dial switch. The frequency of oscillation is considerably higher than the maximum counting speed so that the delay in the production of the predetermining output signal is minimized when this signal is required after numbers such as 100, 200, 110, 230, and so on.

Fig. 2 shows an embodiment of the predetermining circuit which requires more components but less precise adjustment of constants than the first embodiment. The Fig. 2 embodiment has a pair of glow discharge diodes in each of the stages H, T and U. One of these diodes is of a type, such as NE96, having a high voltage spread and the other diode is of the NE48 type having a low voltage spread. The first diode of the pair is used as the signal receiving tube and the second diode of the pair is used as the relay operating tube. The signal receiving diode in each predetermining stage is identified by the letters TS followed by the small letter h, t or u, respectively, denoting stages H, T and U. The relay operating diodes are designated Tph, Tpt and Tpu. The tubes TSh, TSt and TSu are, respectively, connected to cathode resistors RPh, t and u. The anodes of TSh, t and u are connected by rectifiers XPa, b and c to a positive bus which is supplied with a voltage just short of the striking voltage for these tubes and sufficient when supplemented by the voltage of an input signal to a predetermining stage to cause the signal receiving tube of the stage to fire if primed. The relay operating diodes Tph, Tpt and Tpu are connected in series with rectifiers and XPd, e and f and relays PH, PT and PU between a positive bus at about 70 volts and the ground bus.

Only the resistor RPh of the first stage is permanently connected to ground. The resistors RPt and RPu are connected to ground only after the relay in the preceding stage has operated. Thus, the first stage is initially the only conditioned stage. The receipt of a predetermined digit signal by tube TSh causes the tube to fire. Thereupon, the potential appearing across resistor RPh is applied as a positive pulse of potential to the anode of tube Tph, causing the latter to fire. Relay PH operates and closes its armature contacts to connect resistor RPt to ground. The next predetermined digit signal applied to TSt is then effective to trigger it, causing a positive pulse to be applied by capacitor CT to diode Tpt. Diode TPt fires and relay PT operates to connect the resistor RPu to ground, priming TSu to respond to the next applied predetermined signal. When TSu fires, capacitor Cu pulses Tpu, which ignites and operates the relay PU to produce the output effect.

What I claim is:

1. A predetermining system to sense the arrival of a plural order counter device or the like at a predetermined number registration, said system comprising a voltage supply, a series of stages respectively including gaseous discharge tubes selectively connectible to the orders of said counter device or the like in descending order progression to receive digit signals from said orders representing a predetermined number, the signal receiving tube of the first stage being connected across the voltage supply to be primed to fire in response to an applied digit signal and the signal receiving tubes of the succeeding stages being incompletely connected to the voltage supply and initially unprimed, and coupling circuits between each stage and the next for completing the connection of each succeeding signal receiving tube after the first to the voltage supply upon the firing of the preceding signal receiving tube, whereby the signal receiving tubes are primed in succession to fire sequentially in response to signals received from the successively lower orders.

2. A predetermining system as in claim 1, said coupling circuits including a relay between each stage and the next energized in response to the firing of the signal receiving tube of the former stage and relay contacts closed by the relay upon energization for completing the connection of said next signal receiving tube to the voltage supply.

3. A predetermining system to produce an output effect upon sensing the accumulation of a predetermined number of counts in a plural order impulse counter or the like, said system comprising a voltage supply, a series of circuit stages respectively including gaseous discharge diodes having signal input circuits selectively connectible to successively lower orders of the counter to receive digit signals representing a predetermined number, the signal receiving diode of the first stage being initially connected to the voltage supply to be primed to fire in response to a signal from the highest counter order, the succeeding signal receiving diodes being initially incompletely connected to the voltage supply to be unprimed and unresponsive to signals from the associated lower orders of the counter, and coupling means between the stages for completing the connection of each signal receiving diode after the first to the voltage supply upon the firing of the preceding signal receiving diode, whereby the signal receiving diodes of one stage after the other are primed in sequence and fired in the same sequence in response to the predetermined digit signals from the associated counter orders.

4. A predetermining system as in claim 3, said coupling means including relays, each in series with a signal receiving diode to be energized upon firing of the diode and contacts closed by the energized relay for completing the connection of the next signal receiving diode to the voltage supply.

5. A predetermining system as in claim 3, said coupling means including an additional gaseous discharge tube in each stage ignited upon the firing of the signal receiving tube of the same stage and thereupon causing the signal receiving diode of the next stage to be completely connected to the voltage supply and primed to respond to a digit signal.

6. A predetermining system to sense the accumulation of a predetermined number of counts in a plural order counter, said system comprising a voltage supply, a series of circuit stages respectively containing gaseous discharge diodes, a separate signal input circuit for each diode selectively connectible to one of the counter orders to apply a predetermined digit signal therefrom to the diode, said diodes of the series of stages being respectively connectible through said signal input circuits to successively lower orders of the counter and in which the higher orders of the counter are stepped from digit position to digit position by carry entries from the respectively preceding orders, means including connections from the voltage supply to the signal receiving diodes and coupling connections between the diodes for rendering the signal receiving diodes of the series of stages sequentially effective to fire in response to signals on their input circuits and to produce an output effect in response to the firing of the last signal receiving diode of the series, and an oscillator for supplying artificial zero digit signals to the signal receiving diodes to insure correct sequential operation of the predetermining stages for sensing a predetermined number containing zero.

7. A predetermining system to sense the stepping of a counter to a predetermined number, said counter having a plurality of denominational orders of which the higher orders are stepped by carriers from the preceding orders, said system comprising a series of circuit stages respectively including electronic tubes selectively connectible to successively lower orders of the counter to receive digit signals therefrom representing a predetermined number, a source of voltage, connections between the source of voltage and the tubes and between the tubes for rendering them sequentially responsive to predetermined digit signals issued by the counter orders in descending order progression, and supplemental circuit means for artificially supplying zero digit signals to the tubes to insure correct, sequential operation of the tubes of the series of stages in sensing a predetermined number containing zero after any significant digit.

JOHN C. MANLEY.

REFERENCES CITED

The following references are of record in the file of this patent:

UNITED STATES PATENTS

| Number | Name | Date |
|---|---|---|
| 2,402,372 | Compton | June 18, 1946 |
| 2,563,106 | Eugley | Aug. 7, 1951 |